US010115303B2

(12) United States Patent
Pavlin et al.

(10) Patent No.: US 10,115,303 B2
(45) Date of Patent: Oct. 30, 2018

(54) METHODS FOR CONTROLLING A HEADSET DEVICE, HEADSET DEVICES, COMPUTER READABLE MEDIA, AND INFRARED SENSORS

(71) Applicant: RAZER (ASIA-PACIFIC) PTE. LTD., Singapore (SG)

(72) Inventors: Ludmila Veronica Pavlin, Concord, CA (US); Nicholas Bijan Nassiri, San Francisco, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 15/571,753

(22) PCT Filed: May 5, 2015

(86) PCT No.: PCT/US2015/029139
§ 371 (c)(1),
(2) Date: Nov. 3, 2017

(87) PCT Pub. No.: WO2016/178665
PCT Pub. Date: Nov. 10, 2016

(65) Prior Publication Data
US 2018/0144619 A1 May 24, 2018

(51) Int. Cl.
*G02B 27/01* (2006.01)
*G06F 3/01* (2006.01)
(Continued)

(52) U.S. Cl.
CPC .......... *G08C 23/04* (2013.01); *G02B 27/017* (2013.01); *G06F 3/011* (2013.01); *G06T 19/003* (2013.01); *H04R 1/1041* (2013.01); *H04R 1/1008* (2013.01)

(58) Field of Classification Search
CPC ............ G02B 27/017; G02B 2027/014; G02B 2027/0138; G02B 2027/0178;
(Continued)

(56) References Cited

U.S. PATENT DOCUMENTS 7,873,765 B1   1/2011   Herf
8,556,721 B2   10/2013  Aronzon et al.
(Continued)

FOREIGN PATENT DOCUMENTS

CN   204256272 U   4/2015
CN   103019377 A   4/2016
(Continued)

OTHER PUBLICATIONS

First Examination Report dated Jan. 15, 2018 in corresponding Australian Patent Application No. 2015394001, 6 pages.
(Continued)

*Primary Examiner* — Hong Zhou
(74) *Attorney, Agent, or Firm* — Polsinelli PC

(57) ABSTRACT

According to various embodiments, a method for controlling a headset device may be provided. The method may include: capturing an infrared image of a vicinity of the headset device; determining a presence of a pre-determined peripheral device in the vicinity of the headset device based on the infrared image; and controlling a display of the headset device to display a representation of the pre-determined peripheral device based on the determined presence of the pre-determined peripheral device.

20 Claims, 2 Drawing Sheets

(51) Int. Cl.
*G06T 19/00* (2011.01)
*G08C 23/04* (2006.01)
*H04R 1/10* (2006.01)

(58) Field of Classification Search
CPC ...... G06F 3/011; G06F 3/017; G06F 3/04815;
G06F 3/04886; G06T 19/006; G06T 7/70;
H04N 13/044; G08C 23/04
See application file for complete search history.

(56) References Cited

U.S. PATENT DOCUMENTS

| | | | |
|---|---|---|---|
| 8,601,470 | B2 | 12/2013 | Yue et al. |
| 8,628,413 | B2 | 1/2014 | Lemay et al. |
| 8,855,719 | B2 | 10/2014 | Jacobsen et al. |
| 2002/0176330 | A1 | 11/2002 | Ramonowski et al. |
| 2004/0113885 | A1* | 6/2004 | Genc ................ G06F 3/011 345/156 |
| 2011/0018903 | A1 | 1/2011 | Lapstun et al. |
| 2011/0134016 | A1 | 6/2011 | Foxenland |
| 2012/0075095 | A1 | 3/2012 | Howard et al. |
| 2012/0249587 | A1* | 10/2012 | Anderson ........... G06F 3/04895 345/633 |
| 2012/0287284 | A1 | 11/2012 | Jacobsen et al. |
| 2013/0141421 | A1 | 6/2013 | Mount et al. |
| 2013/0208717 | A1 | 8/2013 | Kannappan |
| 2014/0132519 | A1 | 5/2014 | Chun |
| 2014/0285520 | A1* | 9/2014 | Park ..................... G06T 19/006 345/633 |
| 2014/0361976 | A1 | 12/2014 | Osman et al. |
| 2015/0054734 | A1 | 2/2015 | Raghoebardajal et al. |
| 2015/0094142 | A1 | 4/2015 | Stafford |
| 2015/0269783 | A1* | 9/2015 | Yun .................... G02B 27/0172 345/633 |
| 2016/0179336 | A1* | 6/2016 | Ambrus ............... G02B 27/017 715/768 |
| 2016/0217616 | A1* | 7/2016 | Kraver .................... G06F 3/012 |

FOREIGN PATENT DOCUMENTS

| | | |
|---|---|---|
| GB | 2517008 A | 2/2015 |
| KR | 10-1103516 B1 | 1/2012 |
| WO | 2013/130010 A1 | 9/2013 |

OTHER PUBLICATIONS

Extended European Search Report from the European Patent Office, dated Jun. 6, 2018, 7 pages, for the corresponding European Patent Application No. EP15891354.1.

English translation of the Notification of the First Office Action from the State Intellectual Property Office of P.R. China, dated Jun. 28, 2018, 6 pages, for the corresponding Chinese Patent Application No. CN 201580081105.7.

\* cited by examiner

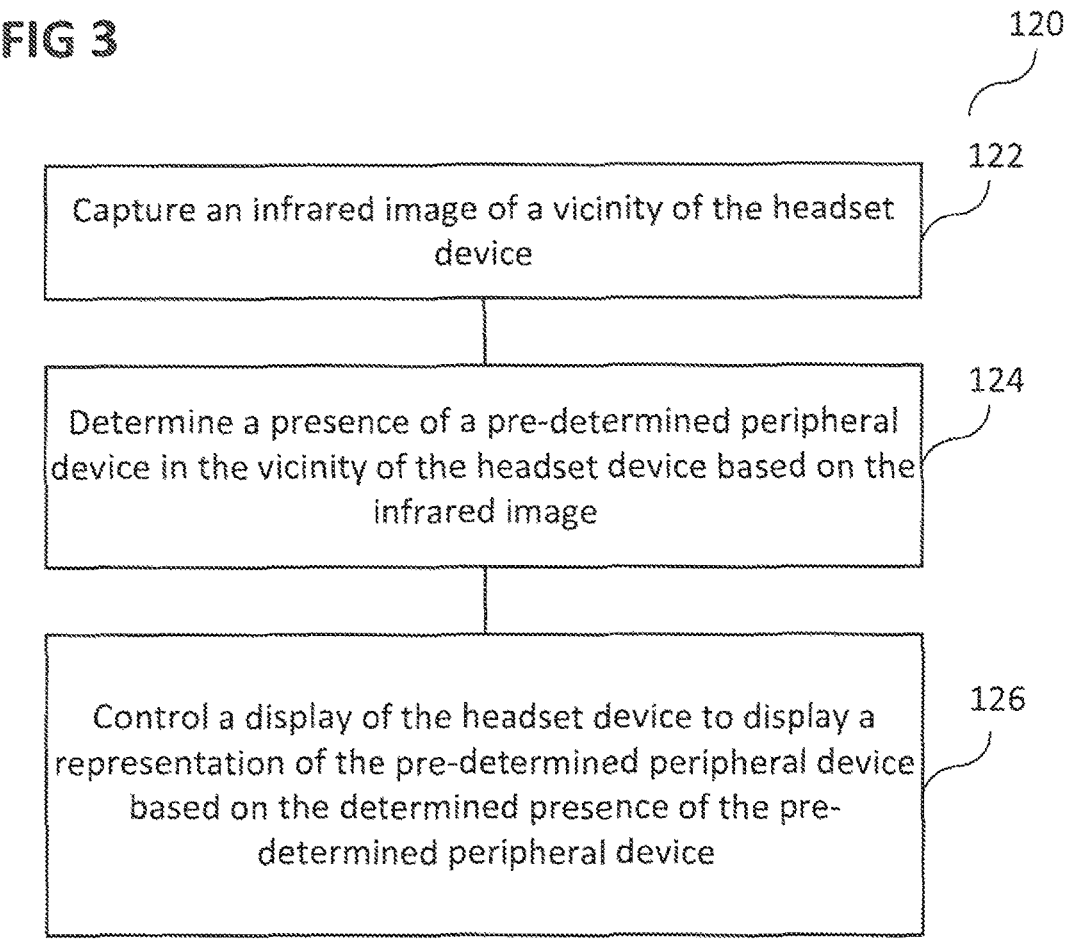
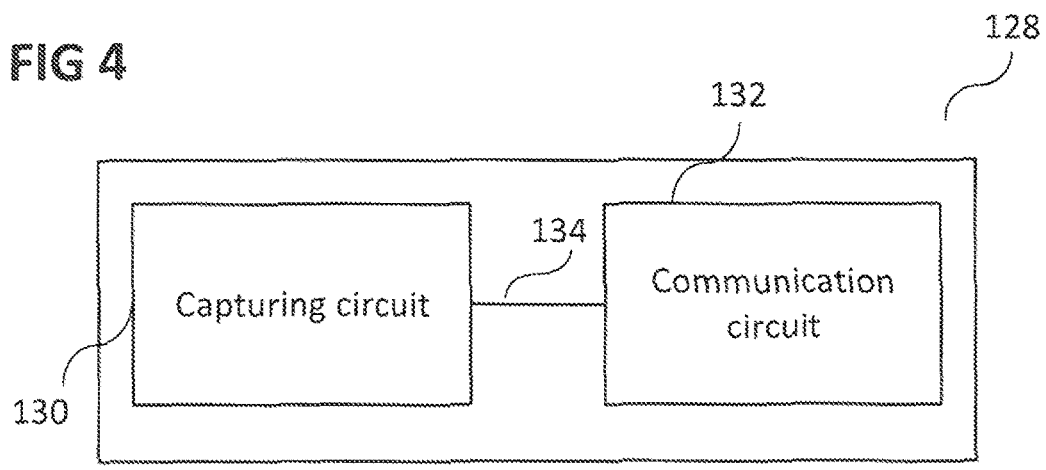

ated with reference to the following drawings, in which:

FIG. 1 shows a headset device according to various embodiments;

FIG. 2 shows a headset device according to various embodiments;

FIG. 3 shows a flow diagram illustrating a method for controlling a headset device according to various embodiments; and FIG. 4 shows an infrared sensor according to various embodiments.

METHODS FOR CONTROLLING A HEADSET DEVICE, HEADSET DEVICES, COMPUTER READABLE MEDIA, AND INFRARED SENSORS

TECHNICAL FIELD

Various embodiments generally relate to methods for controlling a headset device, headset devices, computer readable media, and infrared sensors.

BACKGROUND

While wearing a VR (virtual reality) headset, real world objects may be obscured from view, preventing a user from locating and using a variety of peripherals, like for example keyboards, mice, and other input devices, without removing the headset. Thus, there may be a need to increase usability of headset devices.

SUMMARY OF THE INVENTION

According to various embodiments, a headset device may be provided. The headset device may include: a display; an infrared sensor configured to capture an infrared image of a vicinity of the headset device; a presence determination circuit configured to determine a presence of a pre-determined peripheral device in the vicinity of the headset device based on the infrared image; and a controller configured to control the display to display a representation of the pre-determined peripheral device based on the determined presence of the pre-determined peripheral device.

According to various embodiments, a method for controlling a headset device may be provided. The method may include: capturing an infrared image of a vicinity of the headset device; determining a presence of a pre-determined peripheral device in the vicinity of the headset device based on the infrared image; and controlling a display of the headset device to display a representation of the pre-determined peripheral device based on the determined presence of the pre-determined peripheral device.

According to various embodiments, a computer readable medium may be provided. The computer readable medium may include program instructions which when executed by a processor cause the processor to perform a method for controlling a headset device.

According to various embodiments, an infrared sensor may be provided. The infrared sensor may include: a capturing circuit configured to capture an infrared image of a vicinity of a headset device; and a communication circuit configured to communicate data based on the captured infrared image to the headset device for determining a presence of a pre-determined peripheral device in the vicinity of the headset device based on the infrared image and for controlling a display of the headset device to display a representation of the pre-determined peripheral device based on the determined presence of the pre-determined peripheral device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the follow-

DETAILED DESCRIPTION

Figure 1:
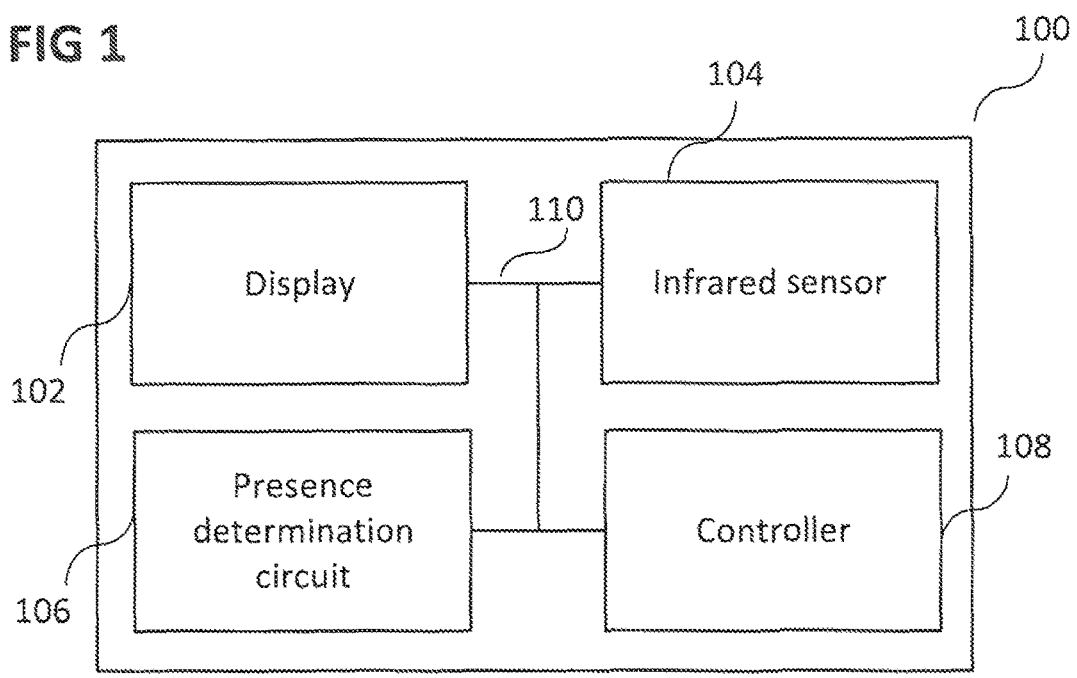

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the headset device as described in this description may include a memory which is for example used in the processing carried out in the headset device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

While wearing a VR (virtual reality) headset, real world objects may be obscured from view, preventing a user from locating and using a variety of peripherals, like for example keyboards, mice, and other input devices, without removing the headset. According to various embodiments, devices and methods may be provided to increase usability of headset devices.

According to various embodiments, peripheral product detection and visualization in VR may be provided. According to various embodiments, HMD (head mounted display) product detection may be provided.

According to various embodiments, a sensor (for example a consumer-grade infrared camera) may be attached to the exterior of the headset and may identify customized indicators (for example sensor stickers) on the peripheral product, may identify the product and may render a 3d model of the product in the VR view relative to the actual physical position of the product.

FIG. 1 shows a headset device 100 (for example a VR headset, or a head mounted display) according to various embodiments. The headset device 100 may include a display 102. For example, the display 102 may display an output of a computer program, for example a computer game. The headset device 100 may further include an infrared sensor 104 configured to capture an infrared image of a vicinity of the headset device 100. The headset device 100 may further include a presence determination circuit 106 configured to determine a presence of a pre-determined peripheral device (not shown in FIG. 1) in the vicinity of the headset device 100 based on the infrared image. The headset device 100 may further include a controller 108 configured to control the display 102 to display a representation of the pre-determined peripheral device based on the determined presence of the pre-determined peripheral device. The display 102, the infrared sensor 104, the presence determination circuit 106, and the controller 108 may be coupled with each other, like indicated by lines 110, for example electrically coupled, for example using a line or a cable, and/or mechanically coupled.

In other words, a headset device according to various embodiments may display information representing a peripheral device in a display of the headset device, in which usually computer program (for example computer game) information are shown, if the headset device determines by using an infrared sensor, that the peripheral device is near the headset device.

According to various embodiments, the presence determination circuit 106 may further be configured to determine presence of an infrared marking (in other words: a marking visible under infrared light (which may for example be light in a wavelength range of 700 nanometers to 1 mm); for example a marking not visible under a light different from infrared light) on the pre-determined peripheral device based on the infrared image. According to various embodiments, the presence determination circuit 106 may further be configured to determine the presence of the pre-determined peripheral device in the vicinity of the headset device 100 based on determining the infrared marking (for example based on determining the infrared marking in the infrared image).

According to various embodiments, the infrared marking may include or may be or may be included in a QR code.

According to various embodiments, the presence determination circuit 106 may further be configured to determine a position of the pre-determined peripheral device relative to the headset device 100 based on the infrared image.

According to various embodiments, the controller 108 may further be configured to control the display 102 to display a three-dimensional representation of the pre-determined peripheral device based on the determined position of the pre-determined peripheral device.

According to various embodiments, the controller 108 may further be configured to control the display 102 to overlay a representation of a surrounding of the headset device with the representation of the pre-determined peripheral device.

According to various embodiments, the controller 108 may further be configured to control the display 102 to overlay an output of a program used by a user of the headset device 100 with the representation of the pre-determined peripheral device.

According to various embodiments, the controller 108 may further be configured to control the display 102 to display the representation of the pre-determined peripheral device based on an action taken by a user of the headset device 100 in a program used by the user (for example in a computer game played by the user).

According to various embodiments, the action taken by the user may include or may be or may be included in opening an input element in a computer program (for example opening a text box).

According to various embodiments, the controller 108 may further be configured to control the display 102 to display the representation of the pre-determined peripheral device based on a pre-determined input into an input device connected to the headset device 100.

Figure 2:
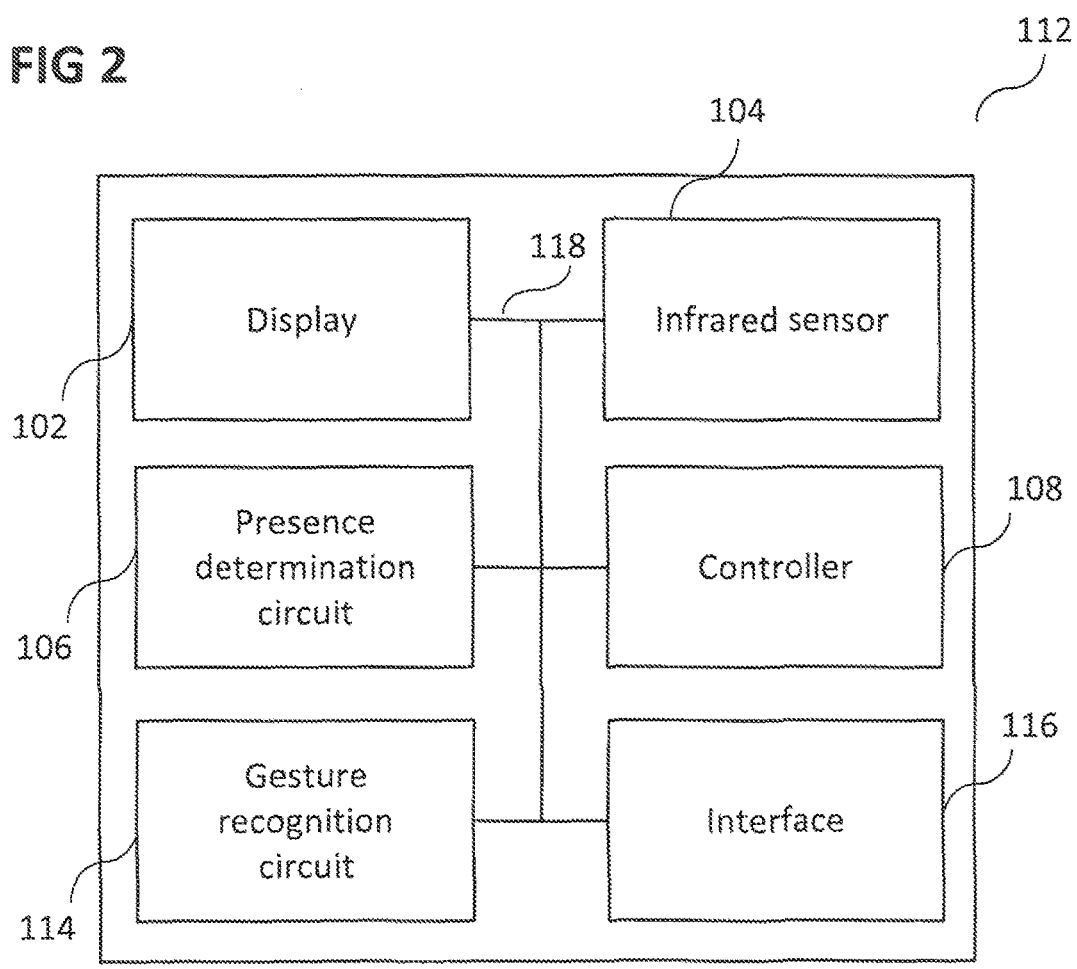

FIG. 2 shows a headset device 112 (for example a VR headset, or a head mounted display) according to various embodiments. The headset device 112 may, similar to the headset device 100 shown in FIG. 1, include a display 102. For example, the display 102 may display an output of a computer program, for example a computer game. The headset device 112 may, similar to the headset device 100 shown in FIG. 1, further include an infrared sensor 104 configured to capture an infrared image of a vicinity of the headset device 100. The headset device 112 may, similar to the headset device 100 shown in FIG. 1, further include a presence determination circuit 106 configured to determine a presence of a pre-determined peripheral device (not shown in FIG. 1) in the vicinity of the headset device 100 based on the infrared image. The headset device 112 may, similar to the headset device 100 shown in FIG. 1, further include a controller 108 configured to control the display 102 to display a representation of the pre-determined peripheral device based on the determined presence of the pre-determined peripheral device. The headset device 112 may further include a gesture recognition circuit 114, like will be described in more detail below. The headset device 112 may further include an interface 116, like will be described in more detail below. The display 102, the infrared sensor 104, the presence determination circuit 106, the controller 108, the gesture recognition circuit 114, and the interface 116 may be coupled with each other, like indicated by lines 118, for example electrically coupled, for example using a line or a cable, and/or mechanically coupled.

According to various embodiments, the gesture recognition circuit 114 may be configured to determine a gesture performed by a user of the headset. According to various embodiments, the controller 108 may further be configured to control the display 102 to display the representation of the pre-determined peripheral device based on the determined gesture.

According to various embodiments, the interface 116 may be an interface to a gesture recognition device (not shown in FIG. 2), and the gesture recognition device may be configured to determine a gesture of a user of the headset device. The interface 116 may be configured to receive information indicating the determined gesture. According to various embodiments, the controller 108 may further be configured to control the display 102 to display the representation of the pre-determined peripheral device based on the determined gesture.

According to various embodiments, the controller 108 may further be configured to control the display 102 to display an interaction of a user of the headset device 100 with the pre-determined peripheral device.

According to various embodiments, the peripheral device may include or may be or may be included in an input device.

According to various embodiments, the peripheral device may include or may be or may be included in a mouse, a keyboard, a touchpad, a gaming controller and/or a joystick.

FIG. 3 shows a flow diagram 120 illustrating a method for controlling a headset device according to various embodiments. In 122, an infrared image of a vicinity of the headset device may be captured. In 124, a presence of a pre-determined peripheral device in the vicinity of the headset device may be determined based on the infrared image. In 126, a display of the headset device may be controlled to display a representation of the pre-determined peripheral device based on the determined presence of the pre-determined peripheral device.

According to various embodiments, the method may further include: determining presence of an infrared marking on the pre-determined peripheral device based on the infrared image; and determining the presence of the pre-determined peripheral device in the vicinity of the headset device based on determining the infrared marking.

According to various embodiments, the infrared marking may include or may be or may be included in a QR code.

According to various embodiments, the method may further include determining a position of the pre-determined peripheral device relative to the headset device based on the infrared image.

According to various embodiments, the method may further include controlling the display to display a three-dimensional representation of the pre-determined peripheral device based on the determined position of the pre-determined peripheral device.

According to various embodiments, the method may further include controlling the display to overlay a representation of a surrounding of the headset device with the representation of the pre-determined peripheral device.

According to various embodiments, the method may further include controlling the display to overlay an output of a program used by a user of the headset device with the representation of the pre-determined peripheral device.

According to various embodiments, the method may further include controlling the display to display the representation of the pre-determined peripheral device based on an action taken by a user of the headset device in a program used by the user.

According to various embodiments, the action taken by the user may include or may be or may be included in activating or opening an input element in a computer program (for example a text box, button, slider or gesture).

According to various embodiments, the method may further include controlling the display to display the representation of the pre-determined peripheral device based on a pre-determined input into an input device connected to the headset device.

According to various embodiments, the method may further include: determining a gesture performed by a user of the headset; and controlling the display to display the representation of the pre-determined peripheral device based on the determined gesture.

According to various embodiments, the method may further include: receiving information indicating a determined gesture from a gesture determination device; and controlling the display to display the representation of the pre-determined peripheral device based on the determined gesture.

According to various embodiments, the method may further include controlling the display to display an interaction of a user of the headset device with the pre-determined peripheral device.

According to various embodiments, the peripheral device may include or may be or may be included in an input device.

According to various embodiments, the peripheral device may include or may be or may be included in a mouse, a keyboard, a touchpad, a gaming controller and/or a joystick.

According to various embodiments, a computer readable medium may be provided. The computer readable medium may include program instructions which when executed by a processor cause the processor to perform a method for controlling a headset device, for example the method for controlling a headset device according to various embodiments like described above with reference to FIG. 3.

FIG. 4 shows an infrared sensor 128 according to various embodiments. The infrared sensor 128 may include a capturing circuit 130 configured to capture an infrared image of a vicinity of a headset device. The infrared sensor 128 may further include a communication circuit 132 configured to communicate data based on the captured infrared image to the headset device for determining a presence of a pre-determined peripheral device in the vicinity of the headset device based on the infrared image and for controlling a display of the headset device to display a representation of the pre-determined peripheral device based on the determined presence of the pre-determined peripheral device. The capturing circuit 130 and the communication circuit 132 may be coupled with each other, like indicated by line 134, for example electrically coupled, for example using a line or a cable, and/or mechanically coupled. For example the headset device may be a headset device like described above with reference to FIG. 1 or FIG. 2. For example the infrared sensor may be mounted on or integrated in the headset device.

According to various embodiments, a system may be provided including a gaming headset with an attached sensor, e.g. consumer-grade infrared camera that is attached to the exterior of the headset. The sensor may identify a peripheral device through identifiers, i.e., customized indicators, sensor stickers, messages, texts, geometric primitives and the like on the peripheral device. The system may provide a processor that identifies the product and renders a 3D virtual model of the peripheral device in the virtual reality view relative to the actual physical position of the peripheral device. The system may provide a virtual graphic depiction of a peripheral device so that the product can be interacted with.

According to various embodiments, the sensor may detect a peripheral device by identifying its infrared-printed pattern. The pattern may include QR codes and other proprietary markings. The sensor data may be translated into 3D location coordinates. Products may be differentiated based on the unique identifier encoded into the QR code or proprietary marking. Data may be matched to a 3D model database of the peripherals. The 3D model of the peripheral in relative special location of the real world object may be rendered. Finally, the peripheral rendering may be hidden and unhidden based on context, for example software driven context, including: a user opening a text chat; a user activating or deactivating the visualizer using hand motions/gestures; and activation and deactivation based on hot key combinations.

According to various embodiments, a peripheral (in other words: a peripheral device) may be detected by identifying an infrared-printed pattern attached to the peripheral device. According to various embodiments, the infrared-printed patterns may include QR codes or any other kind of proprietary markings.

According to various embodiments, sensor data may be translated into 3D location coordinates. According to various embodiments, the 3D location coordinates may be used to display a representation of the peripheral device in the headset of the user.

According to various embodiments, products (for example various peripheral devices) may be differentiated based on the unique identifier encoded into the QR code or the other proprietary marking.

According to various embodiments, data may be matched to a 3D model database of peripherals.

According to various embodiments, a 3D model of the peripheral may be rendered in relative special location of the real world object.

According to various embodiments, the peripheral rendering (in other words: a rendering of the peripheral device) may be hidden and unhidden based on a context (for example a software driven context), for example when a user opens a text chat, or when a user activates or deactivates the visualizer using hand motions (in other words: gestures), or it may be hidden or unhidden (in other words: activated or deactivated) based on hot key combinations.

In the following, a narrative example according to various embodiments will be described.

A user (for example a player) may be using a computer program (for example playing a (computer) game (for example Elite Dangerous), for example on a PC (personal computer), using an OSVR (Open-Source Virtual Reality) headset and a hand sensor, for example a Leap motion hand sensor. The user may see that he has a chat message available for him in the headset (in other words: in the heads up display). After reading the message, the user may decide that he wants to type a reply.

When the user activates the text entry field, the devices or methods according to various embodiments may scan his field of view for peripherals and may detect an input device (for example a keyboard, a mouse, or a joystick, for example a Razer keyboard, a Razer mouse, and/or a flight joystick), all equipped with visualization indicators according to various embodiments.

A 3D model of the input device (for example of the keyboard) may appear in the user's VR headset, and when the user reaches out to touch it, he places his hands on the peripheral on his desk without removing his headset.

As the user type, he may be able to see the physical location of the keys he is touching giving him a visual feedback that he is pressing the correct keys.

When the user closes the text box (in which he has typed the text), the 3D keyboard (in other words: the visualization of the keyboard in the headset) may fade away and the user's mouse and/or the user's joystick may be rendered in 3D so that the user can once again reach out and find them. Once the user's hands are on the joystick and mouse, the 3D models may fade away and the user may return to the full emersion of his game.

The following examples pertain to further embodiments.

Example 1 is a method for controlling a headset device, the method comprising: capturing an infrared image of a vicinity of the headset device; determining a presence of a pre-determined peripheral device in the vicinity of the headset device based on the infrared image; and controlling a display of the headset device to display a representation of the pre-determined peripheral device based on the determined presence of the pre-determined peripheral device.

In example 2, the subject-matter of example 1 can optionally include: determining presence of an infrared marking on the pre-determined peripheral device based on the infrared image; and determining the presence of the pre-determined peripheral device in the vicinity of the headset device based on determining the infrared marking.

In example 3, the subject-matter of example 2 can optionally include that the infrared marking comprises a QR code.

In example 4, the subject-matter of any one of examples 1 to 3 can optionally include determining a position of the pre-determined peripheral device relative to the headset device based on the infrared image.

In example 5, the subject-matter of example 4 can optionally include controlling the display to display a three-dimensional representation of the pre-determined peripheral device based on the determined position of the pre-determined peripheral device.

In example 6, the subject-matter of any one of examples 1 to 5 can optionally include controlling the display to overlay a representation of a surrounding of the headset device with the representation of the pre-determined peripheral device.

In example 7, the subject-matter of any one of examples 1 to 6 can optionally include controlling the display to overlay an output of a program used by a user of the headset device with the representation of the pre-determined peripheral device.

In example 8, the subject-matter of any one of examples 1 to 7 can optionally include controlling the display to display the representation of the pre-determined peripheral device based on an action taken by a user of the headset device in a program used by the user.

In example 9, the subject-matter of any one of examples 1 to 8 can optionally include that the action taken by the user comprises opening an input element in a computer program.

In example 10, the subject-matter of any one of examples 1 to 9 can optionally include controlling the display to display the representation of the pre-determined peripheral device based on a pre-determined input into an input device connected to the headset device.

In example 11, the subject-matter of any one of examples 1 to 10 can optionally include: determining a gesture performed by a user of the headset; and controlling the display to display the representation of the pre-determined peripheral device based on the determined gesture.

In example 12, the subject-matter of any one of examples 1 to 11 can optionally include: receiving information indicating a determined gesture from a gesture determination device; and controlling the display to display the representation of the pre-determined peripheral device based on the determined gesture.

In example 13, the subject-matter of any one of examples 1 to 12 can optionally include controlling the display to display an interaction of a user of the headset device with the pre-determined peripheral device.

In example 14, the subject-matter of any one of examples 1 to 13 can optionally include that the peripheral device comprises an input device.

In example 15, the subject-matter of any one of examples 1 to 14 can optionally include that the peripheral device comprises at least one peripheral device selected from a list of peripheral devices consisting of: a mouse; a keyboard; a touchpad; a gaming controller; and a joystick.

Example 16 is a headset device comprising: a display; an infrared sensor configured to capture an infrared image of a vicinity of the headset device; a presence determination circuit configured to determine a presence of a pre-determined peripheral device in the vicinity of the headset device based on the infrared image; and a controller configured to control the display to display a representation of the pre-determined peripheral device based on the determined presence of the pre-determined peripheral device.

In example 17, the subject-matter of example 16 can optionally include that the presence determination circuit is configured to determine presence of an infrared marking on the pre-determined peripheral device based on the infrared image, and to determine the presence of the pre-determined peripheral device in the vicinity of the headset device based on determining the infrared marking.

In example 18, the subject-matter of example 17 can optionally include that the infrared marking comprises a QR code.

In example 19, the subject-matter of any one of examples 16 to 18 can optionally include that the presence determination circuit is further configured to determine a position of the pre-determined peripheral device relative to the headset device based on the infrared image.

In example 20, the subject-matter of example 19 can optionally include that the controller is further configured to control the display to display a three-dimensional representation of the pre-determined peripheral device based on the determined position of the pre-determined peripheral device.

In example 21, the subject-matter of any one of examples 16 to 20 can optionally include that the controller is further configured to control the display to overlay a representation of a surrounding of the headset device with the representation of the pre-determined peripheral device.

In example 22, the subject-matter of any one of examples 16 to 21 can optionally include that the controller is further configured to control the display to overlay an output of a program used by a user of the headset device with the representation of the pre-determined peripheral device.

In example 23, the subject-matter of any one of examples 16 to 22 can optionally include that the controller is further configured to control the display to display the representation of the pre-determined peripheral device based on an action taken by a user of the headset device in a program used by the user.

In example 24, the subject-matter of any one of examples 16 to 23 can optionally include that the action taken by the user comprises opening an input element in a computer program.

In example 25, the subject-matter of any one of examples 16 to 24 can optionally include that the controller is further configured to control the display to display the representation of the pre-determined peripheral device based on a pre-determined input into an input device connected to the headset device.

In example 26, the subject-matter of any one of examples 16 to 25 can optionally include a gesture recognition circuit configured to determine a gesture performed by a user of the headset; wherein the controller is further configured to control the display to display the representation of the pre-determined peripheral device based on the determined gesture.

In example 27, the subject-matter of any one of examples 16 to 26 can optionally include an interface to a gesture recognition device configured to determine a gesture of a user of the headset device, the interface configured to receive information indicating the determined gesture; wherein the controller is further configured to control the display to display the representation of the pre-determined peripheral device based on the determined gesture.

In example 28, the subject-matter of any one of examples 16 to 27 can optionally include that the controller is further configured to control the display to display an interaction of a user of the headset device with the pre-determined peripheral device.

In example 29, the subject-matter of any one of examples 16 to 28 can optionally include that the peripheral device comprises an input device.

In example 30, the subject-matter of any one of examples 16 to 29 can optionally include that the peripheral device comprises at least one peripheral device selected from a list of peripheral devices consisting of: a mouse; a keyboard; a touchpad; a gaming controller; and a joystick.

Example 31 is a computer readable medium comprising program instructions which when executed by a processor cause the processor to perform a method for controlling a headset device, the method comprising: capturing an infrared image of a vicinity of the headset device; determining a presence of a pre-determined peripheral device in the vicinity of the headset device based on the infrared image; and controlling a display of the headset device to display a representation of the pro-determined peripheral device based on the determined presence of the pre-determined peripheral device.

Example 32 is an infrared sensor comprising: a capturing circuit configured to capture an infrared image of a vicinity of a headset device; and a communication circuit configured to communicate data based on the captured infrared image to the headset device for determining a presence of a pre-determined peripheral device in the vicinity of the headset device based on the infrared image and for controlling a display of the headset device to display a representation of the pre-determined peripheral device based on the determined presence of the pre-determined peripheral device.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for controlling a headset device, the method comprising:
   determining an opening of an input element in a program used by a user;
   capturing an infrared image of a vicinity of the headset device upon the determination of the opening of the input element;
   determining a presence of a pre-determined peripheral device in the vicinity of the headset device based on the infrared image that is captured upon the determination of the opening of the input element; and
   controlling a display of the headset device to display a representation of the pre-determined peripheral device based on the determined presence of the pre-determined peripheral device and the determination of the opening of the input element.

2. The method of claim 1, further comprising:
   determining a presence of an infrared marking on the pre-determined peripheral device based on the infrared image; and
   determining the presence of the pre-determined peripheral device in the vicinity of the headset device based on determining the infrared marking.

3. The method of claim 1, further comprising:
   determining a position of the pre-determined peripheral device relative to the headset device based on the infrared image.

4. The method of claim 3, further comprising:
   controlling the display to display a three-dimensional representation of the pre-determined peripheral device based on the determined position of the pre-determined peripheral device.

5. The method of claim 1, further comprising:
   controlling the display to overlay a representation of a surrounding of the headset device with the representation of the pre-determined peripheral device.

6. The method of claim 1, further comprising:
   controlling the display to overlay an output of the program used by the user of the headset device with the representation of the pre-determined peripheral device.

7. The method of claim 1, further comprising:
   controlling the display to display the representation of the pre-determined peripheral device based on a pre-determined input into an input device connected to the headset device.

8. The method of claim 1, further comprising:
   determining a gesture performed by the user of the headset; and
   controlling the display to display the representation of the pre-determined peripheral device based on the determined gesture.

9. The method of claim 1, further comprising:
   controlling the display to display an interaction of the user of the headset device with the pre-determined peripheral device.

10. A headset device comprising:
    a display;
    an infrared sensor configured to capture an infrared image of a vicinity of the headset device upon a determination of an opening of an input element in a program used by a user;
    a presence determination circuit configured to determine a presence of a pre-determined peripheral device in the vicinity of the headset device based on the infrared image that is captured upon the determination of the opening of the input element; and
    a controller configured to control the display to display a representation of the pre-determined peripheral device based on the determined presence of the pre-determined peripheral device and the determination of the opening of the input element.

11. The headset device of claim 10,
    wherein the presence determination circuit is further configured to determine a presence of an infrared marking on the pre-determined peripheral device based on the infrared image, and to determine the presence of the pre-determined peripheral device in the vicinity of the headset device based on determining the infrared marking.

12. The headset device of claim 10,
    wherein the presence determination circuit is further configured to determine a position of the pre-determined peripheral device relative to the headset device based on the infrared image.

13. The headset device of claim 12,
    wherein the controller is further configured to control the display to display a three-dimensional representation of the pre-determined peripheral device based on the determined position of the pre-determined peripheral device.

14. The headset device of claim 10,
    wherein the controller is further configured to control the display to overlay a representation of a surrounding of the headset device with the representation of the pre-determined peripheral device.

15. The headset device of claim 10,
    wherein the controller is further configured to control the display to overlay an output of the program used by the user of the headset device with the representation of the pre-determined peripheral device.

16. The headset device of claim 10,
    wherein the controller is further configured to control the display to display the representation of the pre-determined peripheral device based on a pre-determined input into an input device connected to the headset device.

17. The headset device of claim 10, further comprising:
    a gesture recognition circuit configured to determine a gesture performed by the user of the headset;
    wherein the controller is further configured to control the display to display the representation of the pre-determined peripheral device based on the determined gesture.

18. The headset device of claim 10, further comprising:
    an interface to a gesture recognition device configured to determine a gesture of the user of the headset device, the interface configured to receive information indicating the determined gesture;

wherein the controller is further configured to control the display to display the representation of the pre-determined peripheral device based on the determined gesture.

19. The headset device of claim 10, wherein the controller is further configured to control the display to display an interaction of the user of the headset device with the pre-determined peripheral device.

20. An infrared sensor comprising:
a capturing circuit configured to capture an infrared image of a vicinity of a headset device upon a determination of an opening of an input element in a program used by a user; and
a communication circuit configured to communicate data based on the captured infrared image to the headset device for determining a presence of a pre-determined peripheral device in the vicinity of the headset device based on the infrared image that is captured upon the determination of the opening of the input element and for controlling a display of the headset device to display a representation of the pre-determined peripheral device based on the determined presence of the pre-determined peripheral device and the determination of the opening of the input element.

* * * * *